W. L. SKINNER.
ADJUSTABLE RADIUS ROD.
APPLICATION FILED JULY 27, 1921.

1,437,562.

Patented Dec. 5, 1922.

Inventor
William L. Skinner.
By Watson E. Coleman Attorney.

Patented Dec. 5, 1922.

1,437,562

UNITED STATES PATENT OFFICE.

WILLIAM LAUREN SKINNER, OF THOMASTON, ALABAMA.

ADJUSTABLE RADIUS ROD.

Application filed July 27, 1921. Serial No. 487,884.

*To all whom it may concern:*

Be it known that I, WILLIAM LAUREN SKINNER, a citizen of the United States, residing at Thomaston, in the county of Marengo and State of Alabama, have invented certain new and useful Improvements in Adjustable Radius Rods, of which the following is a specification, reference being had to the accompanying drawings.

This invention relates to automobile radius rods, and particularly to an adjustable radius rod.

It has been found that axles will frequently get out of alignment by weakening of the springs, or other parts of the car such as spring hangers becoming defective due to wear. With the rigid form of radius rod, it is impossible to remedy these defects by adjusting the parts to compensate for the wear.

It is, therefore, an object of the invention to provide radius rods which will permit any adjustment necessary to the axle or wheels or adjacent parts of the automobile.

It is also an object of the invention to provide a device of this character capable of being conveniently adjusted without disconnecting any portion of the device from the automobile.

It is also an object of the invention to provide a device of this character wherein both rods may be adjusted simultaneously by means which also serves to connect one portion of the device to the automobile.

With these and other objects in view the invention consists in the improved construction and arrangement of parts to be hereinafter more particularly described, fully claimed and illustrated in the accompanying drawings, in which:—

Figure 1:
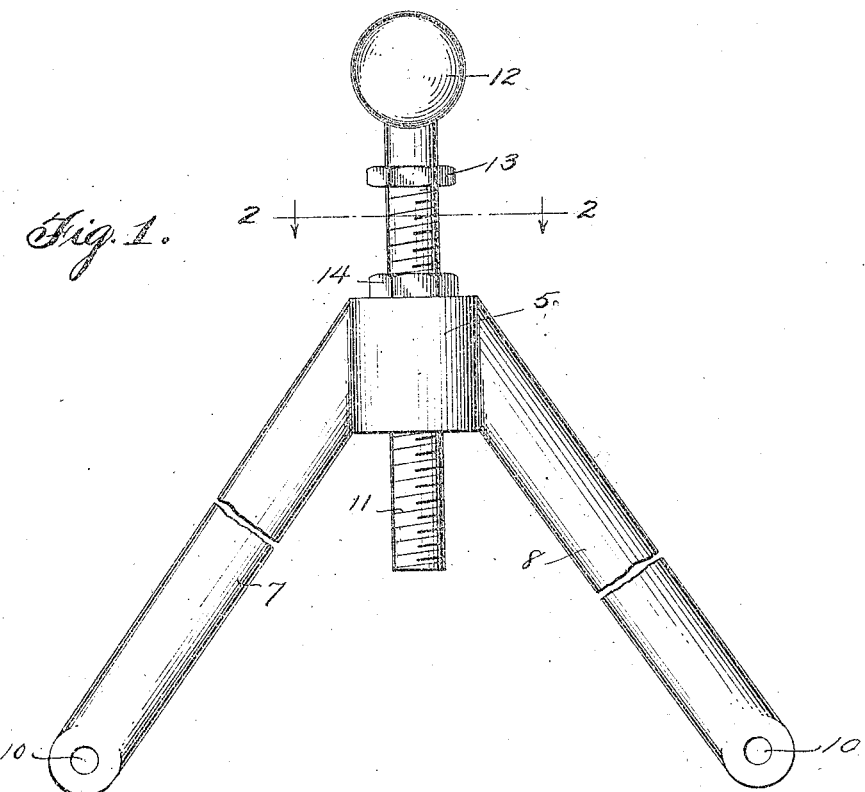
Figure 2:
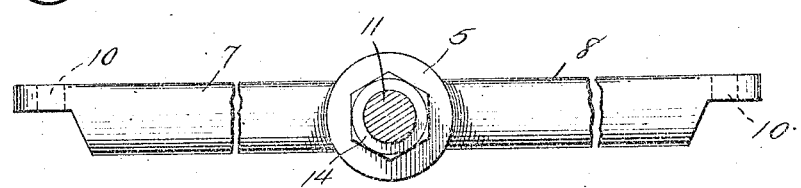
Figure 3:
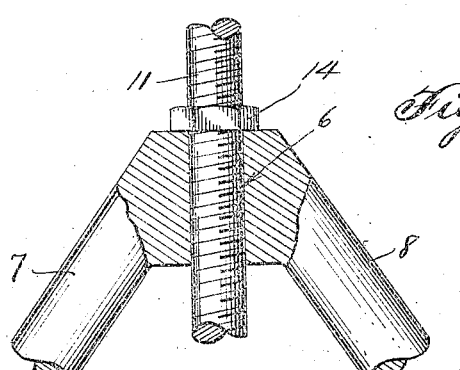

Figure 1 is a plan view of an adjustable radius rod constructed in accordance with an embodiment of the invention, Figure 2 is a section taken on the line 2—2 of Figure 1, and Figure 3 is a fragmentary sectional view of the sleeve and connecting member.

Referring to the drawings, 5 designates a connecting sleeve or bearing member having a threaded bore 6 which extends from one end of the sleeve to the other, the distance between the outer edge of the sleeve and edge of the bore being almost as great as the diameter of the bore, so as to render the sleeve substantial. The sleeve is also constructed relatively long, so as to prevent unnecessary movement of the means disposed within the bore.

Formed integral with the sleeve 5, and projecting therefrom, are arms 7 and 8, each arm being disposed in angular relation to the sleeve and in divergent relation to each other. It will be noted that the connection of the arms to the sleeve extends from one end of the sleeve to the opposite end of the sleeve so that danger of breaking is eliminated, and a substantial connection provided. The opposite ends of the arms 7 and 8 are provided with openings 10 adapted to receive connecting means for securing the rods to an automobile.

In order to permit the device to be readily adjustable without disconnecting the rods from the vehicle, there is provided a novel adjustable connecting member consisting of a shank 11 which is threaded, said shank being relatively long. One end of the shank is provided with an enlargement 12 for connection to a vehicle, while below the enlargement 12 is a stationary nut collar 13, by means of which the shank may be rotated, while rotatable on the shank beneath the collar 13 is a nut 14.

The shank 11 is adapted to be engaged with the threads of the bore 6 and to move through the sleeve when the shank is rotated. This is possible by applying a wrench to the collar 13, without disconnecting the enlargement 12 or forward ends of the rods from the vehicle. Upon rotation of the shank 11, in view of the fact that the arms 7 and 8 are part of the sleeve 5, said arms will be adjusted simultaneously, and to the same extent. After the shank 11 has been rotated to the point of adjustment desired, the nut 14 is rotated into binding engagement with the end of the sleeve to firmly hold the shank in its adjusted position.

From the foregoing it will be readily seen that this invention provides a novel form of radius rod which may be adjusted by anyone to permit adjustment of the adjacent parts of the automobile, said adjustment rendering the rod efficient at all times. Another important feature is that the arrangement of the adjusting element is such that it does not require alteration of the conventional make of automobile, or the addition of special parts for holding the rods, and when once adjusted will remain in its adjusted position indefinitely.

What is claimed is:—

Means for adjusting a radius rod embodying a substantially elongated interior threaded sleeve, rods formed integral with opposed side portions of the sleeve and radiating from the sleeve in divergent relation, the connection of said rods to the sleeve extending from one end of the sleeve to the opposite end thereof, a threaded shank movable within the threaded sleeve, and a lock nut carried by the shank and arranged to engage one end face of the sleeve, said elongated shank substantially providing a bearing for the shank to prevent lateral movement of the shank relative to the sleeve.

In testimony whereof I hereunto affix my signature.

WILLIAM LAUREN SKINNER.